United States Patent [19]
McCormick

[11] Patent Number: 5,488,872
[45] Date of Patent: Feb. 6, 1996

[54] SYSTEM AND METHOD FOR LOAD SENSING

[75] Inventor: Peter McCormick, Dallas, Tex.

[73] Assignee: EOA Systems, Inc., Dallas, Tex.

[21] Appl. No.: 79,091

[22] Filed: Jun. 17, 1993

[51] Int. Cl.⁶ .................................................. G01L 1/00
[52] U.S. Cl. ........................ 73/862.68; 73/862.06
[58] Field of Search .................. 73/DIG. 4, 862.06, 73/862.041, 862.043, 862.68

[56] References Cited

U.S. PATENT DOCUMENTS

| | | |
|---|---|---|
| 4,300,503 | 11/1981 | Deleris et al. ................ 73/DIG. 4 |
| 4,356,423 | 10/1982 | Gudzin . |
| 4,598,592 | 7/1986 | McMaster . |
| 4,739,666 | 4/1988 | Häfner et al. . |
| 4,802,371 | 2/1989 | Calderara et al. . |
| 4,821,584 | 4/1989 | Lembke ...................... 73/862.68 |
| 5,010,773 | 4/1991 | Lorenz et al. ................ 73/862.68 |
| 5,054,323 | 10/1991 | Hubbard, Jr. et al. . |
| 5,265,481 | 6/1993 | Sonderegger et al. ........ 73/862.625 |

*Primary Examiner*—Richard E. Chilcot, Jr.
*Assistant Examiner*—R. Biegel
*Attorney, Agent, or Firm*—Daniel V. Thompson

[57] ABSTRACT

An intelligent load sensing system employs a piezoelectric sensor and digital processor for providing accurate sensing of loads, collisions, and vibrations.

7 Claims, 10 Drawing Sheets

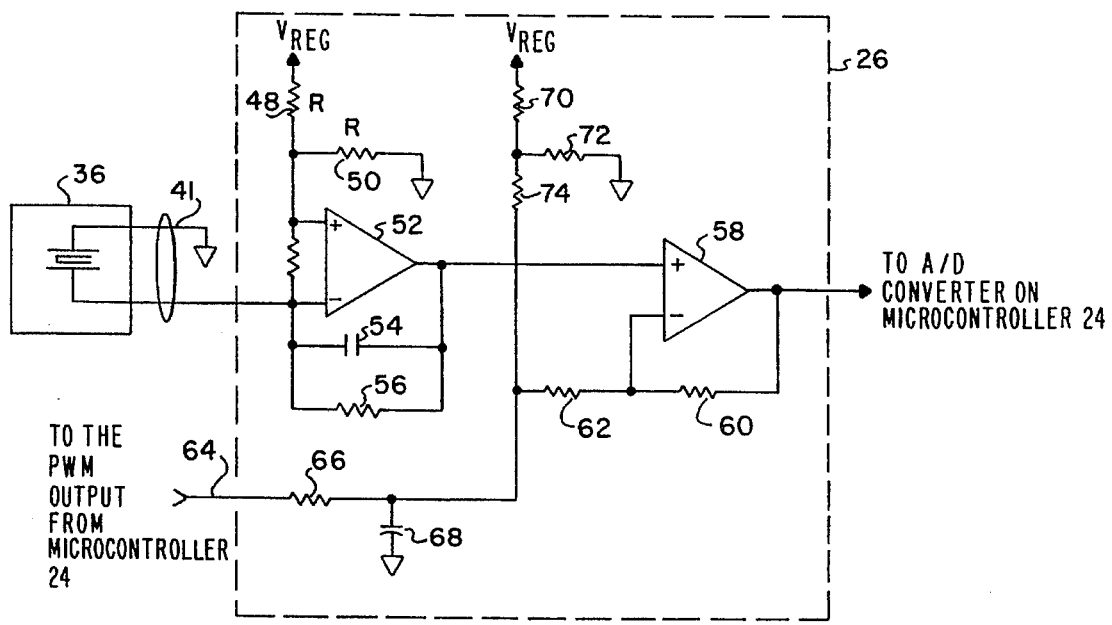
FIG. 2
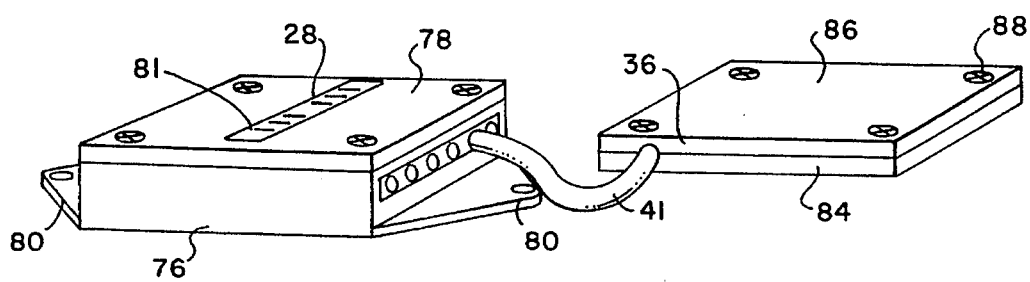
FIG. 3
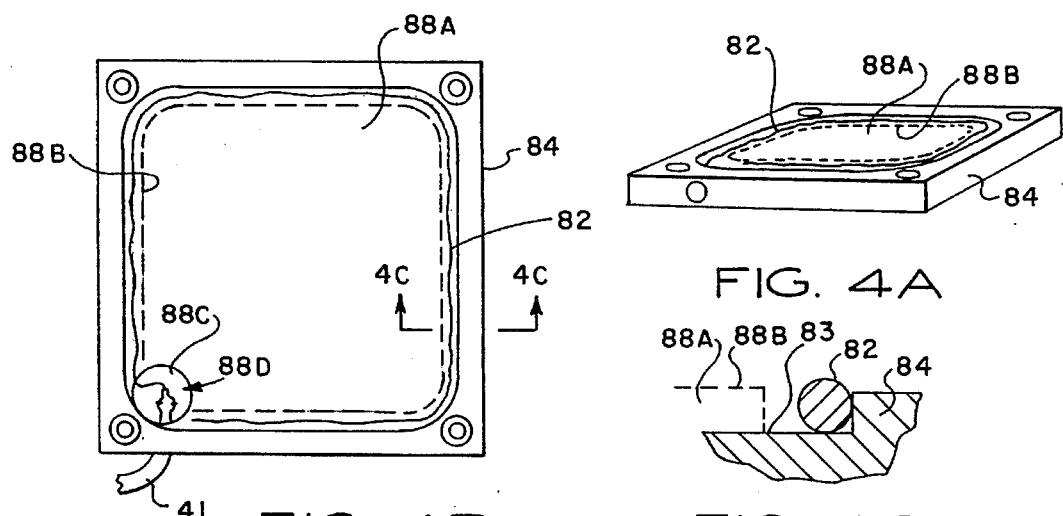
FIG. 4A
FIG. 4B
FIG. 4C

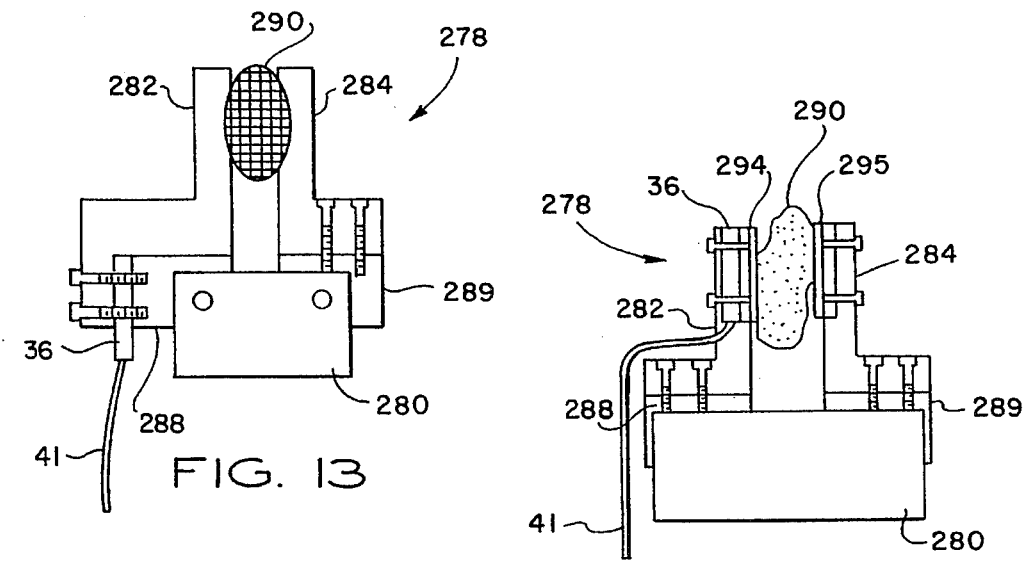
FIG. 13
FIG. 14
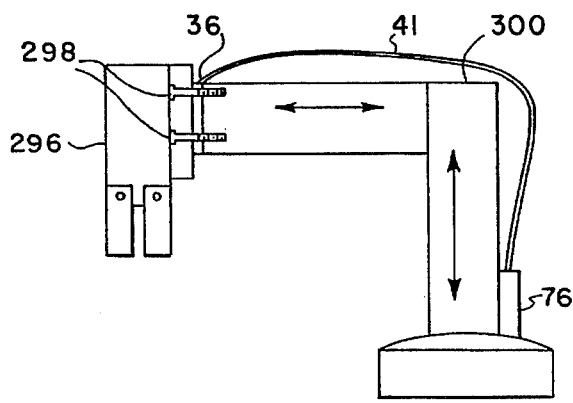
FIG. 15
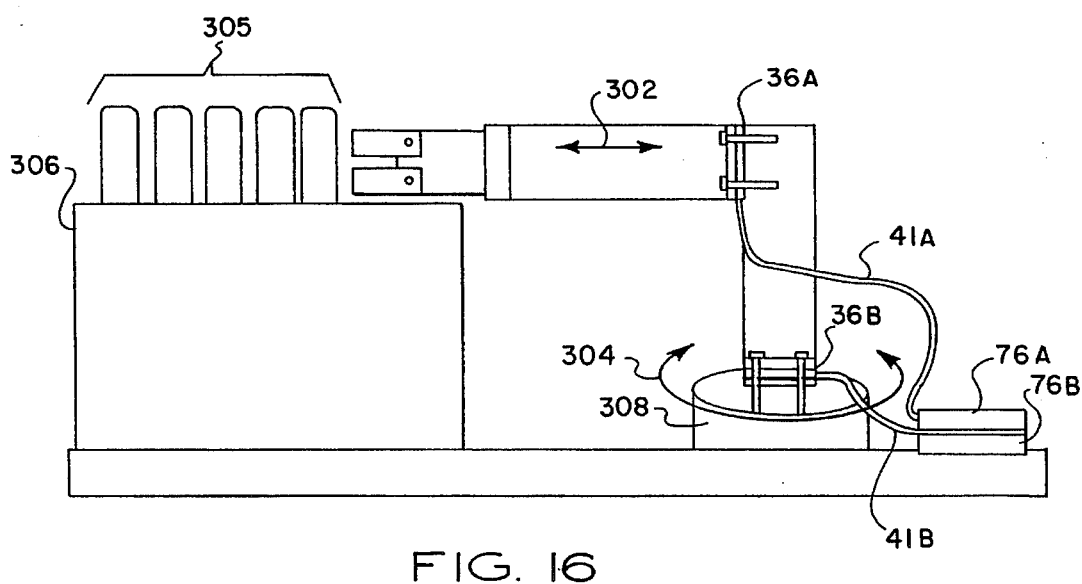
FIG. 16

5,488,872

SYSTEM AND METHOD FOR LOAD SENSING

FIELD OF THE INVENTION

This invention relates generally to a load sensing system, and in particular to a system employing a piezoelectric sensor assembly and intelligent processor means coupled thereto for providing multiple modes of operation.

BACKGROUND OF THE INVENTION

In many industrial environments it is desirable to detect and sense physical loads. For example, in a parts handling system using a robot, it is necessary to detect the presence of an object or the collision between the robot and the surrounding environment. Various sensors, such as strain gauges, load cells, and photocell interrupter switches, have been only marginally successful in this regard due to problems such as bias offsets and the limitation that they cannot be compressed without destruction.

In an improved but not entirely satisfactory technique, piezoelectric sensors have been employed for sensing forces wherein a piezoelectric material generates a voltage potential in response to a compressive force. Typically, the piezoelectric sensor is mechanically biased by compressing it between two surfaces so that both compressive and expansive forces may be measured. A major limitation of the piezoelectric sensor is that it is prone to large variances in bias and does not adapt well to dynamic load changes. Moreover, the rudimentary signal conditioning circuitry previously used for piezoelectric sensors tends to drift and requires constant adjustment for accurate measurement.

Accordingly, it can be seen that there is a need for a load sensing system and method which is rugged, accurate, and is easily adaptable to robotic applications.

SUMMARY OF THE INVENTION

To overcome the limitations in the prior art described above, and to overcome other limitations that will become apparent upon reading and understanding the present specification, the present invention includes an intelligent load sensing system and method employing a rugged piezoelectric sensor mechanically biased in a compressed condition. The system includes a microcontroller for conditioning the output of the piezoelectric sensor and provides four modes of operation, namely: load sensing with manually adjustable thresholds, load sensing with learned thresholds, collision detection, and vibration detection. The system detects static or dynamic loads in all linear directions and even torsionally. In the load sensing with learned threshold mode, threshold adjustments are automatically made by the microcontroller in response to learning the highest and lowest thresholds, and intelligent interpretation is thus provided in that loads which do not fall within the learned thresholds are ignored.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific, preferred examples of load sensing systems and methods in accordance with the present invention.

BRIEF DESCRIPTION OF THE DRAWINGS

Referring now to the drawings in which like reference numerals and letters indicate corresponding elements throughout the several views:

FIG. 2 is a schematic diagram of the adjustable bias amplifier of FIG. 1;

FIG. 3 is a perspective view of a piezoelectric sensor assembly coupled to the processor control unit;

FIGS. 4A and 4B are perspective and top views of the sensor assembly of FIG. 3 with the lid removed;

FIG. 4C is a sectional view taken along lines 4C—4C of FIG. 4B;

FIG. 13 illustrates a robotic gripper application employing a load sensing switch practiced in accordance with the principles of the present invention;

FIG. 14 illustrates an alternative embodiment for a load switch for use with the robotic gripper;

FIG. 15 illustrates an application for detecting collision with a system practiced in accordance with the principles of the present invention;

FIG. 16 illustrates an application employing a first and second load sensor for sensing linear and rotary loads respectively;

DETAILED DESCRIPTION OF THE PREFERRED EMBODIMENT

In the following description of the preferred embodiment, reference is made to the accompanying drawings which form a part hereof, and in which is shown by way of illustration specific preferred embodiments in which the invention may be practiced. It is to be understood that other embodiments may be utilized and structural changes may be made without departing from the scope of the present invention. It is also to be understood that the drawings are not necessarily to scale and certain aspects depicted therein may be exaggerated to illustrate the invention more clearly.

Figure 1:
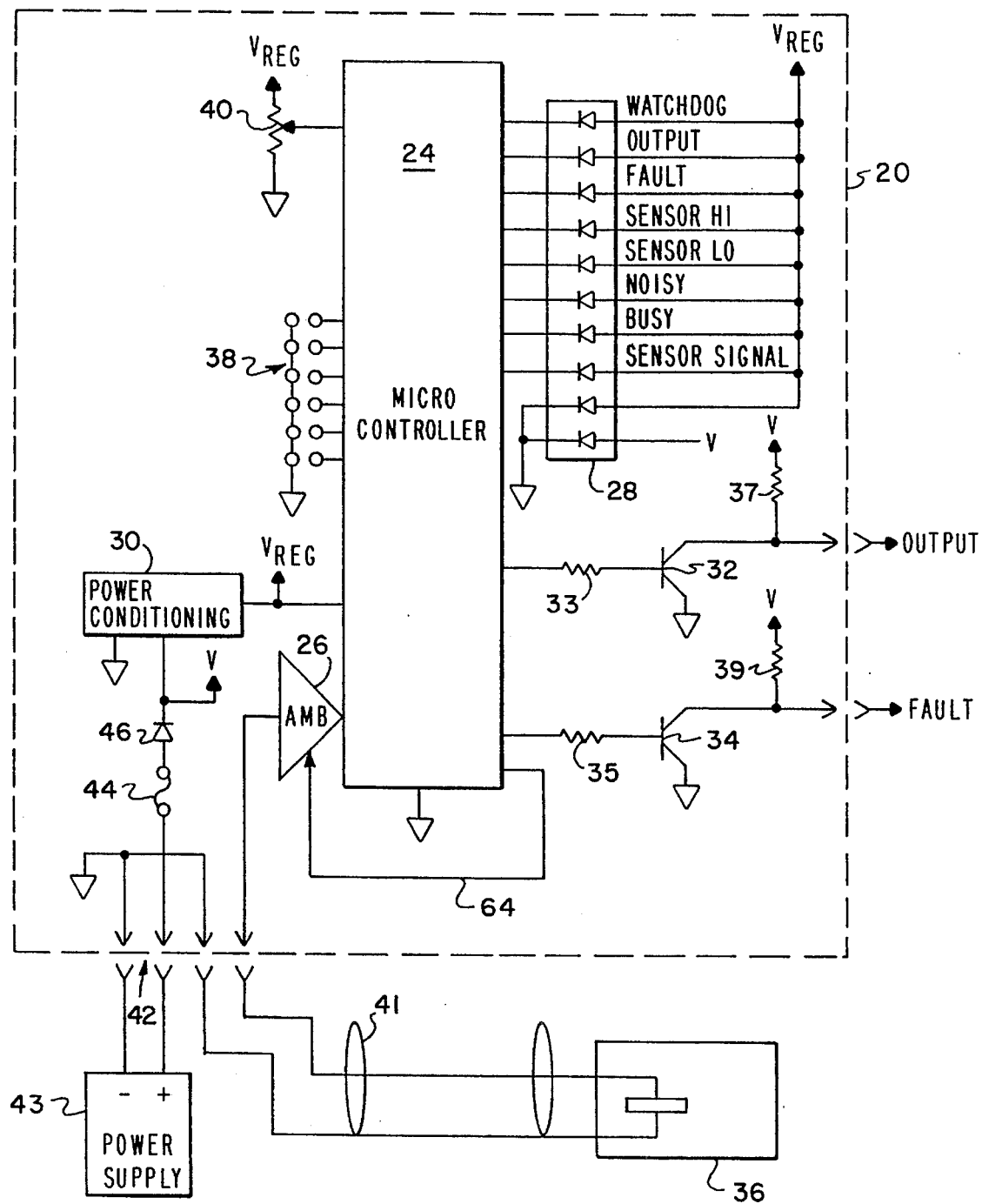
FIG. 1 is a schematic diagram of a load sensing system practiced in accordance with the principles of the present invention.

Reference is now made to FIG. 1, which depicts a schematic diagram of a load sensing system practiced in accordance with the principles of the present invention. A circuit board 20 includes a microcontroller 24, an amplifier 26 having an adjustable bias, a light emitting diode (LED)

display 28, a power conditioning circuit 30, and first and second drive transistors 32 and 34. In the preferred embodiment microcontroller 24 is a single integrated circuit package including, but not limited to, a boolean processor, data memory (RAM), program memory (ROM or EPROM), a plurality of programmable timers, a pulse width modulation (PWM) output, at least two analog to digital converter input ports, and a plurality of digital input and output ports. Exemplary, but not exclusive of the microcontroller 24 is the S87C752 integrated circuit described in data sheet publication 853-144305426 dated Jan. 30, 1992, from the SIGNETICS Company of Sunnyvale, Calif., said publication incorporated herein by reference.

The microcontroller 24 selectably adjusts the DC bias of the amplifier 26 via a PWM output 64. The microcontroller 24 drives the LED display 28 by sinking current through its digital output port and current limiting resistors (not shown), for giving a visual indication of: the presence of applied power, the presence of regulated power, a sensor signal, a busy signal, a noisy signal, high and low threshold error signals, a fault signal, an output signal, and a watchdog signal. The sensor signal represents the output from the piezoelectric sensor 36, and its brightness varies with dynamic changes in the applied load. The busy signal indicates that the sensor 36 is in transition or oscillating and that samples of the sensor 36 output are not being taken. The noisy signal indicates that the sensor signal is varying between two points which are deemed to be so far apart that the signal is noisy. The high and low threshold error signals indicate that a large positive or negative force has been exerted on the sensor 36 which exceeds the high or low threshold limits. The watchdog signal is an indicator that the microcontroller 24 is running.

The circuit board 20 further includes a series of jumpers 38 coupled to an input port on the microcontroller 24. The jumpers 38 permit the user to select, via interrogation by the microcontroller 24, the different modes of operation such as load detection, vibration detection, and collision detection. A trim potentiometer 40 is provided on the circuit board 20 to establish a manually adjustable analog threshold voltage to the microcontroller 24. The analog voltage from the potentiometer 40 is converted by an internal analog to digital converter (ADC) in the microcontroller 24 for use with a series of control steps described in more detail hereinbelow. The microcontroller 24 sinks current through base resistors 33 and 35 to drive the transistors 32 and 34 respectively. The transistors 32 and 34 are preferably NPN transistors having their respective collectors pulled up to the applied voltage V by collector resistors 37 and 39. The output transistor 32 indicates whether a load is present, when a collision has occurred, or whether there is excessive vibration, depending upon the selected mode of operation from jumpers 38. The fault transistor 34 indicates that a sensor fault has occurred, as described hereinbelow.

A power supply 43 supplies the applied voltage (V) on terminals 42, through protective fuse 44, and through the reverse polarity protection diode 46. The cathode of the protection diode 46 provides the applied voltage V to the power conditioning circuit 30 which includes a zener diode (not shown) and a regulator (not shown) for regulating and dropping the voltage to logic compatible levels. Many expedients are known for the power conditioning circuit 30, the exact configuration not being necessary for the understanding of the present invention.

A piezoelectric sensor 36 outputs a voltage in the range of one millivolt when force is applied thereto. The voltage is transmitted to the circuit board 20 over a shielded RF cable 41. The piezoelectric sensor 36 preferably includes a cable such as, but not limited to, the KYNAR® PIEZO CABLE described in product data sheet 56 revised May 1993, order number 65749, from AMP Incorporated of Valley Forge, Pa. Said cable is currently known to be used in applications where the presence of vehicles on roadways is sensed, and it has not previously been used in any robotics environment known to the inventor. KYNAR PIEZO CABLE is a piezoelectric polymer sensor construction. The KYNAR PIEZO CABLE has the appearance of standard coaxial cable, but is constructed with a piezoelectric polymer insulation layer between the copper braided inner conductor and the outer shield. Protected by a rugged polyurethane jacket, these cables have withstood the rigors of over-the-road highway sensors for vehicle classification, truck weight, and aircraft identification and tracking on taxiways. The cable has provided excellent service in buried and fence-mounted sensors for airports and other installation perimeter security applications. As evidence of its wide dynamic range, the piezo cable develops 10's of millivolts with light finger taps, and has been successfully tested as a muscle tremor sensor. As an analog impact sensor, the cable produces 10's of volts into 10 MO input impedance.

KYNAR PIEZO CABLE has the following features:

Passive, Long Strength Sensor

Very Tough, Water Resistant and Flexible

Withstands 100 MPa Pressure and 3% Strain

Temperature Stability to 100° C.

Self-Shielded Coaxial Construction

Broad Frequency Response (0.01 Hz to $10^7$ Hz)

High Voltage Response

Low Impedance Per Unit Length

Simplified Interconnections

Field Repairable

KYNAR PIEZO CABLE has the following typical properties:

| Properties | Units | Value |
| --- | --- | --- |
| Capacitance @ 1 kHz | pF/m | 600 |
| Tensile Strength | MPa | 240 |
| Young's Modulus | GPa | 2.3 |
| Density | kg/m$^3$ | 1890 |
| Acoustic Impedance | MRayl | 2.7 |
| Relative Permittivity | @1 kHz | 9 |
| Tangent Delta | @1 kHz | 0.017 |
| Hydrostatic Piezo Coefficient | pC/N | 15 |
| Longitudinal Piezo Coefficient | Vm/N | $250 \times 10^{-3}$ |
| Hydrostatic Piezo Coefficient | Vm/N | $150 \times 10^{-3}$ |
| Electromechanical Coupling | % | 20 |
| Energy Output | mJ/Strain (%) | 10 |
| Voltage Output | kV/Strain (%) | 5 |

The cable is preferably sandwiched between two plates as described in more detail hereinbelow with respect to FIGS. 3–5. When an external force is applied to the piezoelectric sensor 36, which is maintained in a compressive or tensile state, the sensor 36 develops a proportionate open circuit voltage. The piezoelectric material is dynamic in that it develops an electrical charge proportional to changes in applied mechanical forces.

A simple analogy for explaining the operation of the sensor 36 is the action of a sponge discharging and soaking up water as outside pressure is first applied and then released. In this analogy, the sensor 36 acts as a sponge releasing and drawing an electrical charge as deformation takes place. Once deformation stops, no further charge is transferred. When the unit volume of the sensor 36 is placed in tension, the net sensor volume increases, resulting in a lower charge density at the positive and negative electrode surfaces. To achieve electrical neutrality, electrons flow through the cable 41 connecting the sensor 36 with an equivalent capacitance (capacitor 54) in the bias amplifier 26. When the sensor 36 is configured as a load switch and a force is exerted thereon, the sensor 36 will send out a brief positive voltage, and when the load is removed, a brief negative voltage is sent out.

Reference is now made to FIG. 2, which shows the adjustable bias amplifier 26 of FIG. 1 in more detail. The output of the piezoelectric sensor 36 is coupled to an inverting input of a charge amplifier 52. The charge amplifier 52 eliminates the time constant effect or delay induced by the sensor 36 and the connecting cable 41. Alternatively stated, the capacitance of the sensor 36 and the connecting cable 41 have no adverse effect on the transfer function of the amplifier 26. Moreover, the tolerances on the size of the sensor 36 and the length of the cable 41 are not critical for accurate performance. The charge amplifier 52 quickly soaks up the charges developed by the sensor 36 and exhibits a substantially zero input impedance, resulting in substantially no voltage being generated across the sensor 36. The charge on the sensor 36 is transferred to a capacitor 54 coupled in a feedback loop between the output and the inverting input of the charge amplifier 52. The gain of the charge amplifier 52 is approximately set by the ratio of the capacitor 54 to the capacitance of the sensor 36. The output of the charge amplifier 52 is prevented from drifting by a bleed resistor 56 exhibiting an extremely high resistance coupled in parallel with the capacitor 54 across the inverting input and the output of the charge amplifier 52. The noninverting input of the charge amplifier 52 is further biased to a voltage substantially midway between the regulated voltage $V_{Reg}$ and ground potential by a voltage divider formed by resistors 48 and 50, so that the voltage produced by the sensor 36 can vary therebetween.

The output of the charge amplifier 52 is coupled to a noninverting input on a gain amplifier 58. The gain of the amplifier 58 is set by the ratio of resistors 60 and 62. A DC offset in the form of a pulse width modulation (PWM) signal 64 is applied by the microcontroller 24 to the inverting input. The PWM signal 64 is first averaged or filtered by a resistor 66 in combination with a capacitor 68 which forms a low pass filter. Resistors 70, 72 and 74 are coupled to the low pass filter to load the resultant DC voltage, so that the dithering effect on the output of the gain amplifier 58 is limited when the PWM signal 64 changes by one count.

Figure 5:
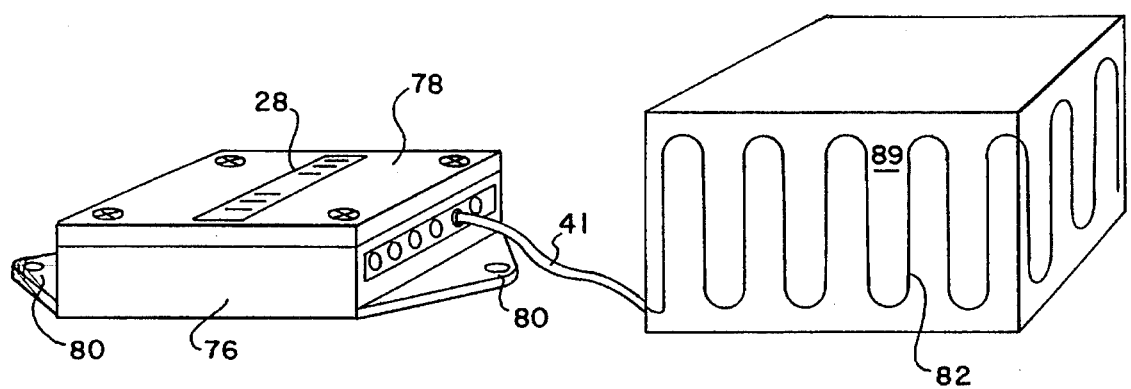
FIG. 5 is a perspective view of the control unit coupled to an alternative embodiment of the piezoelectric sensor assembly.

Reference is made to FIGS. 3–5 which depict various views of the construction and arrangement of the piezoelectric sensor assembly 36 coupled to the control circuit board 20 with the RF shielded connecting cable 41. The circuit board 20 is housed in a box 76 having a removable lid 78 and mounting flanges 80. The removable lid 78 provides access to the jumpers 38 and the trim potentiometer 40 located on the enclosed circuit board 20. The lid 78 includes an opening 81 for viewing the LED display 28.

Referring to FIGS. 4A, 4B and 4C, several inches of piezoelectric cable 82 are disposed in a milled recess 83 in a first plate 84 adjacent second plate 86. The dimensions of recess 83 are selected, with respect to the diameter of cable 82, such that plates 84 and 86 compress the cable 82 therebetween. In one working embodiment of the invention cable 82 has a diameter of 0.08 inch, while recess 83 is 0.05 inch deep. The plates 84 and 86 have substantially identical external dimensions, are preferably made of aluminum, and are fastened together with a plurality of bolts 88 along their peripheries. Cable 82 is placed substantially adjacent the periphery of recess 83, as shown in FIG. 4C, to permit a "machinable area" 88A shown by dashed line 88B. Machinable area 88A is provided for drilling holes for through bolts by the end user. A pocket 88C provides a slightly deeper location for solder connections 88D between cables 41 and 82. FIG. 5 depicts an alternate embodiment wherein the cable 82 is woven or epoxied to the surface of a machine 89 for detecting collision, vibration, or applied load.

Reference is now made to FIGS. 6–12 which depict flow diagrams of the control steps taken by the microcontroller 24 in processing the signal from the sensor assembly 36. At step 90, the microcontroller 24 initializes internal timers and variables in its memory space, described in more detail hereinbelow. At step 92, the microcontroller 24 initiates the analog to digital conversion of the sensor voltage and reads a digitized value representative of it after conditioning by the amplifier 26. The digitized value is stored in a memory location after the conversion is complete. The value is tested at steps 94 and 96 for minimum and maximum values respectively. The error indicators in the LED display 28 are set to indicate a sensor error at steps 98 and 100 in response to sensing a minimum or maximum value at steps 94 and 96 respectively. If the value of sensor does not match a minimum or maximum value, the sensor low/high error indicators are turned off at steps 102 and 104.

In steps 106 and 108, a watchdog indicator in the LED display 28 is flashed, preferably several times per second, for indicating to the user that the microcontroller 24 is executing the steps depicted in FIGS. 6–12. After toggling the watchdog LED in the display 28, the high and the low values of the sensor 36 are compared in step 110 with samples previously taken at the time of the last toggling of the watchdog indicator. If the difference is excessive, due to signal or ground noise, or if the amplifier 26 is in the process of compensating a recent transition in the signal as described hereinbelow, then the noisy indicator in the LED display 28 is illuminated at step 112. Otherwise, the signal is determined to be settled, and both the noisy and busy indicators in the display 28 are extinguished at step 114. At step 116, the internal watchdog timer is reinitialized to timeout after another predetermined period, preferably about 0.2 seconds.

The PWM output 64 is tested for its positive and negative limits at step 118, and the fault indicator in the display 28 is set in response thereto at step 120. At step 122, it is tested for more than one mode selected on jumpers 38, and the fault indicator in the display 28 is set in response thereto at step 120. Referring to steps 124–134, if the number of times the watchdog timer toggles is below a predetermined amount, a power up condition is sensed and the PWM output 64 is adjusted very rapidly to minimize delay in biasing the amplifier 26. Otherwise, a power up condition is not sensed, and the PWM signal 64 is adjusted more slowly so that the amplifier 26 does not over compensate for changes on the sensor 36. The PWM signal 64 attempts to bias the output of the amplifier 26 at a value near midway between $V_{Reg}$ and ground. If the output of the amplifier 26 is greater than this value, the duty cycle of PWM signal is decreased to adjust the DC bias voltage downwardly.

Figure 7:
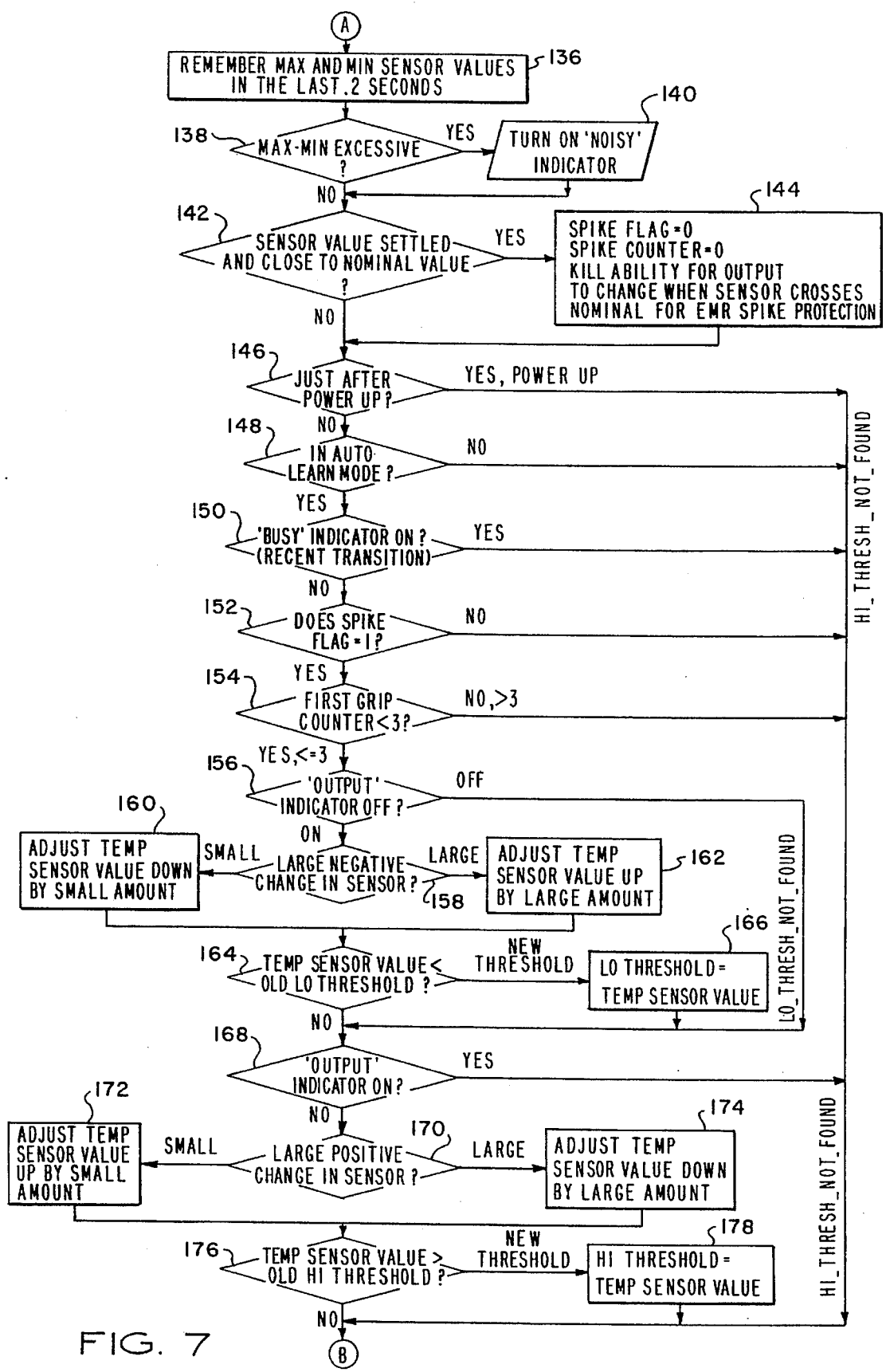

Referring to FIG. 7, at steps 136–138 a quick test is performed to determine if the sensor signal is noisy. The test is similar to the test performed at step 110 in FIG. 6, except the quick test is performed with sensor samples taken closer together in time. The noisy indicator in display 28 is turned on at step 140 if the quick test of step 138 fails. The noisy indicator is only turned off if the sensor signal has settled for the predetermined period of time set forth in step 106. Thus, the noisy indicator is turned on nearly instantaneously if the sensor signal exceeds the thresholds but is only turned off if the signal has settled for the predetermined period of time. Similarly, the busy indicator is turned off only if the sensor signal has settled for the predetermined period of time set forth in step 106.

If the sensor value is settled and close to the nominal value, a spike flag and a spike counter are reset at steps 142 and 144. The spike timer ensures that the sensor value is maintained away from the nominal value for at least the predetermined period of time before new thresholds are learned and an output change is permitted.

Steps 146–154 are performed to determine if the thresholds are to be automatically learned. Specifically, step 146 determines if a power up condition exists, step 148 determines if the learning mode is not selected, step 150 determines if there has been a recent transition in the output, i.e., the busy indicator is on, step 152 determines if the sensor value has been away from the nominal value for at least the predetermined period of time, i.e., the spike flag is set, and step 154 determines if a minimum number of load occurrences have occurred. If any of the conditions in steps 146–154 fail, threshold learning is skipped. If the output indicator is off as determined in step 156, then a sensor value greater than the nominal value exists due to a positive applied force. It is not desirable to learn threshold values less than the nominal value due to negative loads, so the low threshold learning steps 158–166 are skipped as decided in step 156. If the output indicator is on, control is passed to step 158. A temporary value for the sensor is downwardly adjusted in steps 160 and 162 by either a small or a large amount depending upon the magnitude of the signal as decided in step 158. The temporary value of the sensor is adjusted to preserve tracking for future cycles so that the threshold can be more easily reached. At step 164, the adjusted temporary value is compared with the current low threshold, and if it is large enough, it is stored as the new low threshold value at step 166. Steps 168–178 perform a similar method for learning the high threshold when the sensor value is greater than the nominal value.

Figure 8:
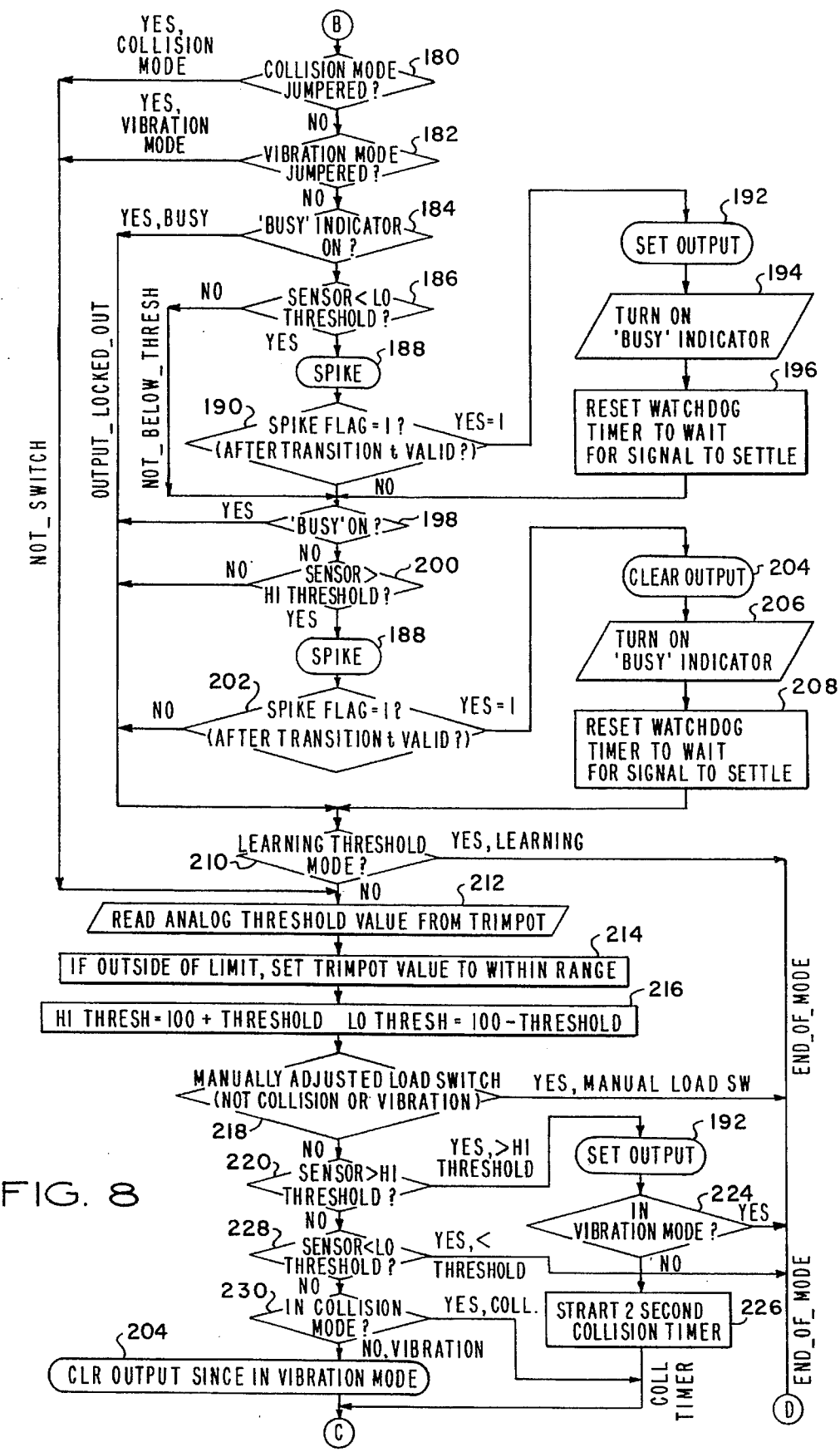
Figure 12:
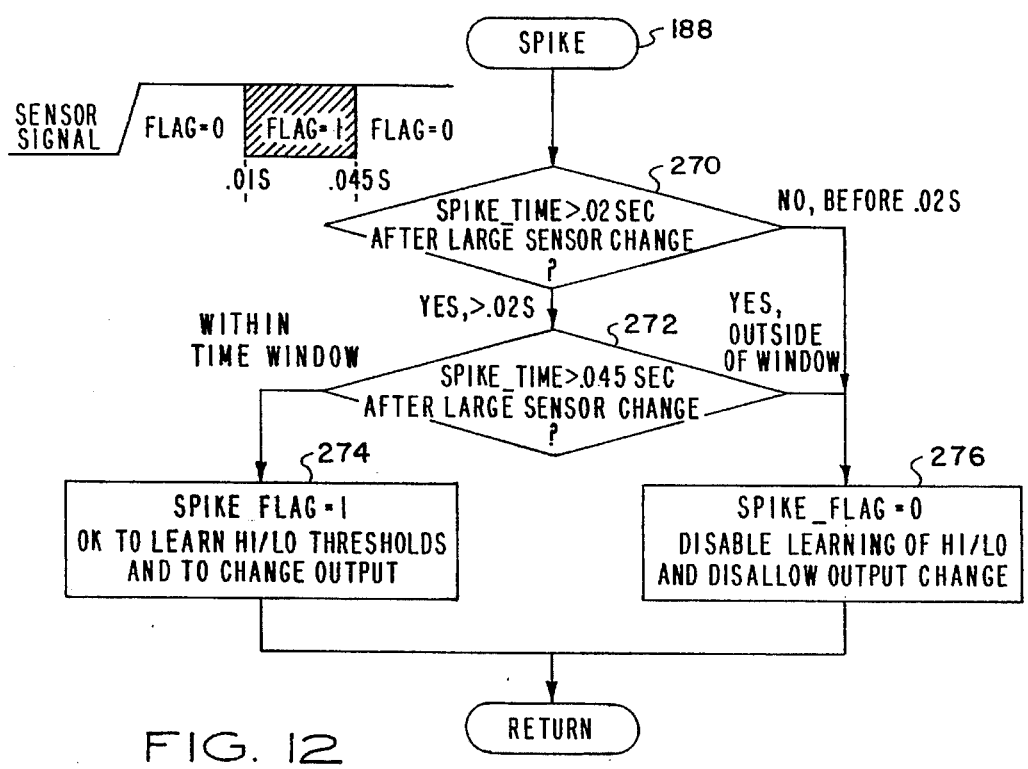

Referring now to steps 180–182 in FIG. 8, a determination is made as to whether or not the output signal should change. If either the collision or the vibration modes are selected via jumpers 38, control is passed to step 212. If the busy indicator is sensed active at step 184, control is passed to step 210 to avoid setting or clearing the output. At step 186 the sensor value is checked for a value lower than the low threshold. If the sensor value is lower than the low threshold, control is transferred to step 188 for handling a possible spike, otherwise control is transferred to step 198. Step 188 comprises a series of steps as depicted in FIG. 12 and described in more detail hereinbelow. If the sensor value changes within an allowable time window, the output and busy indicators are set, and the watchdog timer is reset as can be seen in steps 190–196. Setting the busy indicator in step 194 keeps the output from clearing until the sensor signal is settled. The watchdog timer is cleared in step 196 to insure that the full period of time elapses before clearing the busy indicator. Steps 198–208 perform a similar procedure for checking if the sensor value is greater than the high threshold.

If the learned threshold mode is set by the jumpers 38 as decided at step 210, steps 212–234 are skipped to avoid reading the threshold voltage from the potentiometer 40. Otherwise control is transferred to step 212, wherein the threshold voltage from the potentiometer 40 is read through an analog to digital converter (ADC) port in the microcontroller 24. The high and low thresholds are assigned in step 216 by adding the value read in step 212 to a nominal value. If the mode of operation is set as a manual threshold load switch as decided in step 218, the output is not changed, and control is transferred to step 236 in FIG. 9. Otherwise the sensor value is compared in step 220 to the high threshold set by the potentiometer 40. The output is set in step 192 if the sensor value is greater than the threshold. If the collision mode is selected as determined in step 224, a collision timer is initiated in step 226. If the sensor value is less than the high threshold and not lower than the lower threshold as determined in step 228, then the mode is checked for the collision mode at step 230, otherwise control is transferred to step 234 in FIG. 9. If the mode is not the collision mode, the output is cleared at step 232 indicating a vibration mode, resulting in the output flickering as the sensor value vacillates above and below the thresholds as vibration occurs.

Figure 9:
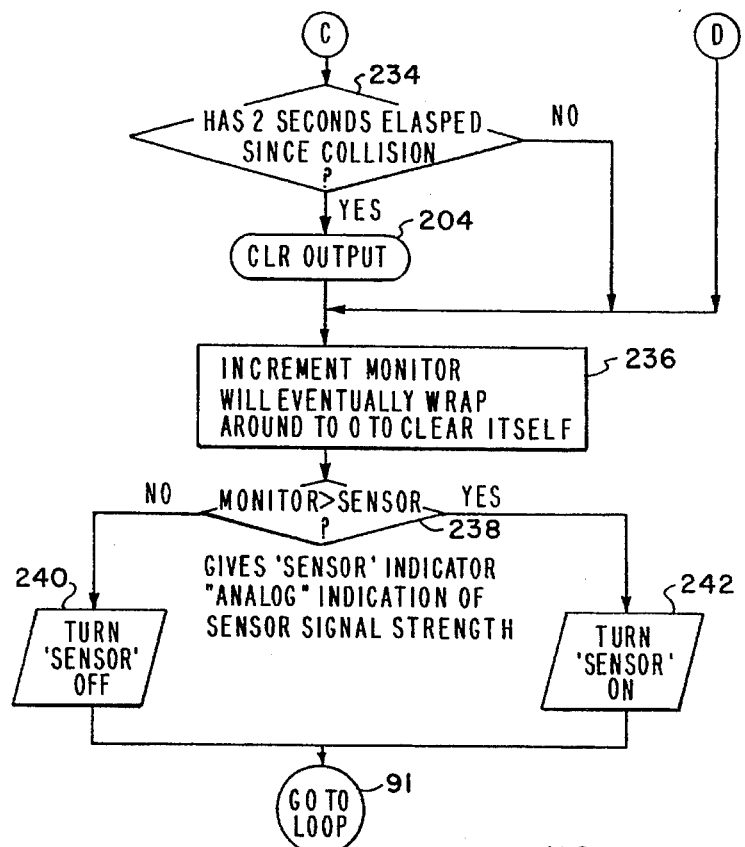

Referring now to FIG. 9, the output is cleared in steps 234 and 236 after the passage of the predetermined period of time. At step 236, a monitor timer is incremented. At step 238 the monitor timer is compared with the value of the sensor. If the monitor timer is greater than the sensor value, the sensor indicator in the display 28 is turned off at step 240 and is turned on at step 242 if it is less than the sensor. This variable duty cycle on the sensor LED creates an analog brightness for the sensor signal in the display. At step 91, control is transferred back to step 92 in FIG. 6 so that the above-described process is reiterated.

Figure 10:
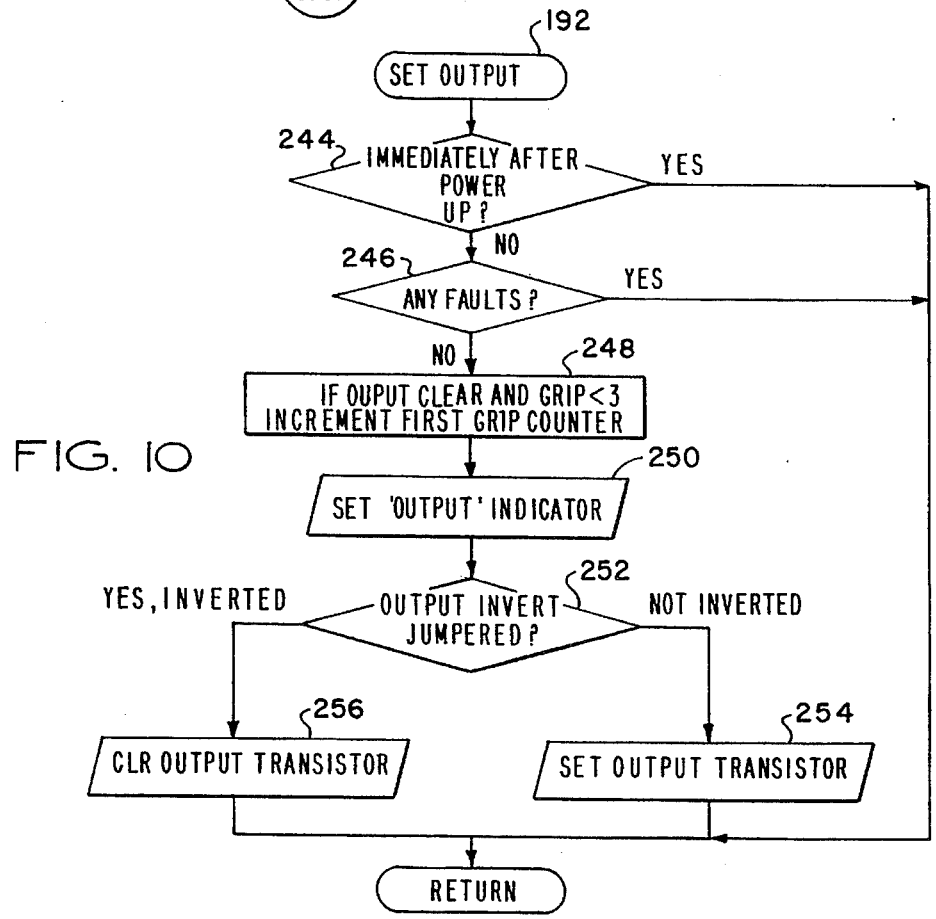

Reference is made to FIG. 10 which depicts the series of steps comprising the set output step 192 for turning on the output transistor 32 and the output indicator in the display 28. The circuit depicted in FIG. 1 is not stable if a power up condition is sensed at step 244, or if a fault condition is sensed in step 246. The output is thus inhibited from changing in response thereto, and control is returned to the step following the set output step 192. At step 248 a counter is incremented to track the number of occurrences that a load has been applied after power up. When the counter reaches a predetermined number, preferably three, the automatic learn thresholds steps depicted in FIG. 7 are masked out by step 154 to limit learning to the first few occurrences of the load and to avoid learning inadvertent glitches thereafter. The output indicator is turned on at step 250. If the invert jumper on jumpers 38 is set as decided in step 252, the output logic is inverted in step 256, and the output transistor 32 is cleared. Otherwise, step 254 sets the output transistor 32.

Figure 11:
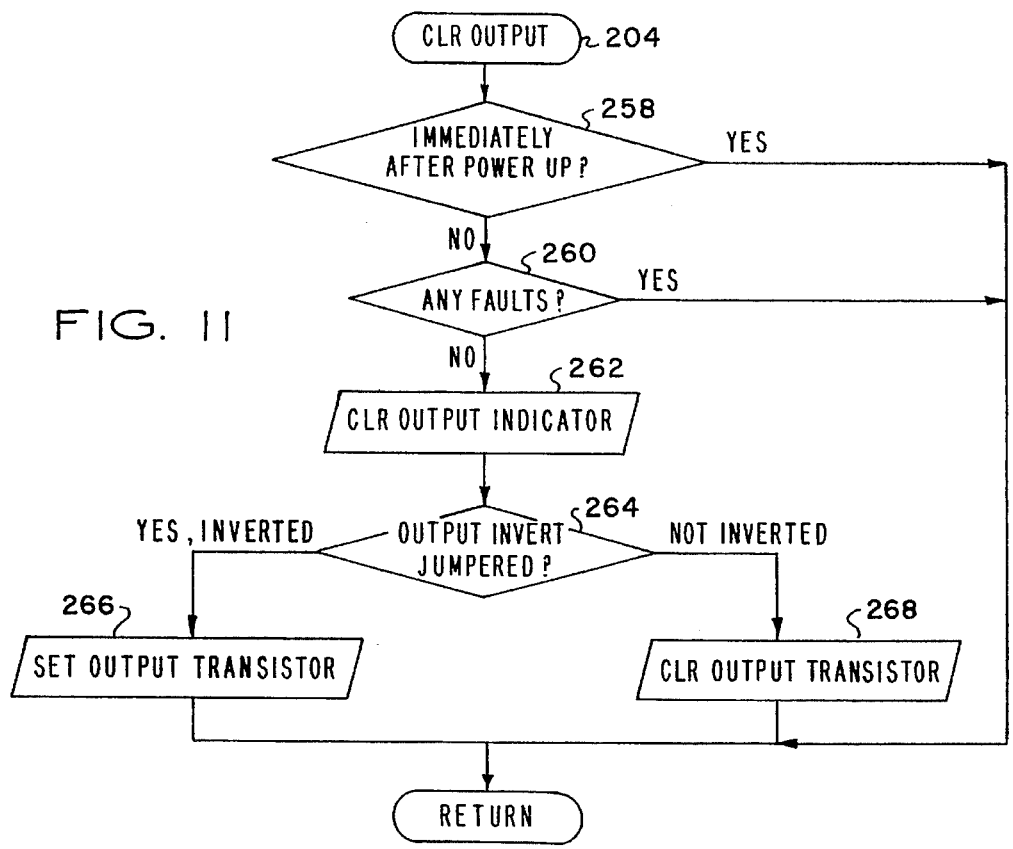

Reference is now made to FIG. 11 which depicts the series of steps comprising the clear output step 204. If a power up condition is sensed in step 258 or if a fault condition is sensed in step 260, the circuit in FIG. 1 is not stable and output changes are inhibited. Otherwise, the output indicator in the display 28 is cleared at step 262. If the invert jumper on jumpers 38 is set, the output transistor 32 is set in step 266. Otherwise, the output transistor 32 is cleared at step 268.

Reference is now made to FIG. 12 which depicts the series of steps comprising the spike step 188. The spike step 188 is invoked when the vibration or collision mode is not selected and the value of the sensor satisfies the requirement of being above the high threshold or below the low threshold. If the spike timer set in step 144 is between a predetermined time window, preferably between 0.02 to 0.045 seconds, as determined in steps 270 and 272, a flag is set at step 274 to allow changes on the output and/or to allow learning of a new threshold. If the timer does not fall within the time window, output change and learning are inhibited at step 276.

Reference is now made to FIGS. 13–20 which depict typical applications employing a load switch and a system practiced in accordance with the principles of the present invention. Referring specifically to FIGS. 13 and 14, a robotic gripper 278 comprises a gripper actuator 280 for pivotally or linearly actuating first and second fingers 282 and 284 which are movably mounted to the actuator 280 by way of first and second gripper actuator blocks 288 and 289, respectively. In the first embodiment depicted in FIG. 13, a load sensor 36 is coupled between the first finger 282 and first gripper actuator block 288. As the object 290 is grasped, the load sensor 36 is compressed and generates a voltage in response thereto which is transmitted down the load sensor cable 41. In FIG. 14, the load sensor 36 is mounted normal to the surface of the finger 282 and between a first gripper pad 294 made of steel or rubber. A second gripper pad 295 is mounted in mating relation to the first pad 294 on the second finger 284 for grasping the object 290 therebetween. In both embodiments, the fingers 282 and 284 linearly traverse in and out to grasp and release the object 290.

Referring now to FIG. 15 a sensor 36 is mounted for detecting collision. The sensor 36 is mounted between the tool 296 being protected and the actuator arm 300 with bolts 298. The sensor 36 signals collision detection, thereby shutting down or reversing arm 300, to prevent extensive damage to the tool 296 when the tool 296 has an unintended collision with an object.

Referring now to FIG. 16 a first and second load sensor 36A and 36B are depicted for sensing linear and rotary loads, respectively. Obstructions along the linear axis 302 are sensed by the first load sensor 36A. The second load sensor 36B, mounted to the pedestal portion 308 on which the arm rotates, detects torsional loads around axis 304, such as when the arm searches for parts 305 in the plane of the table 306 by pivoting around its pedestal 308.

Figure 17:
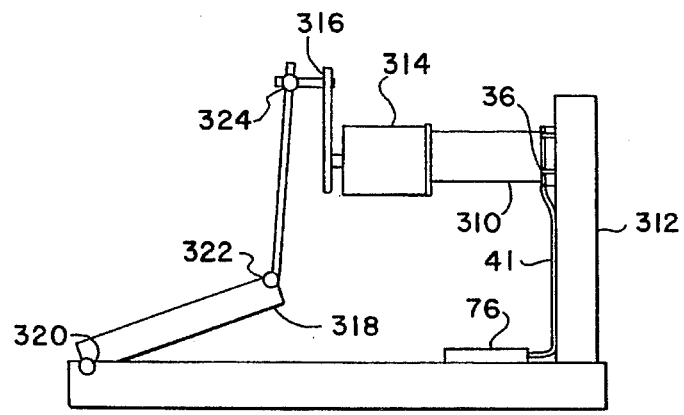
FIG. 17 illustrates a beam loading application for detecting deflection of a load beam with a load switch practiced in accordance with the principles of the present invention.

A cantilever beam loading application is depicted in FIG. 17 wherein the sensor 36 is mounted between a cantilever load beam 310 and a vertical wall 312. A geared motor actuator 314 rotates a bellcrank arm 316 to oscillate a machine members 318 and 319 around the pivot points 320, 322 and 324.

Figure 18:
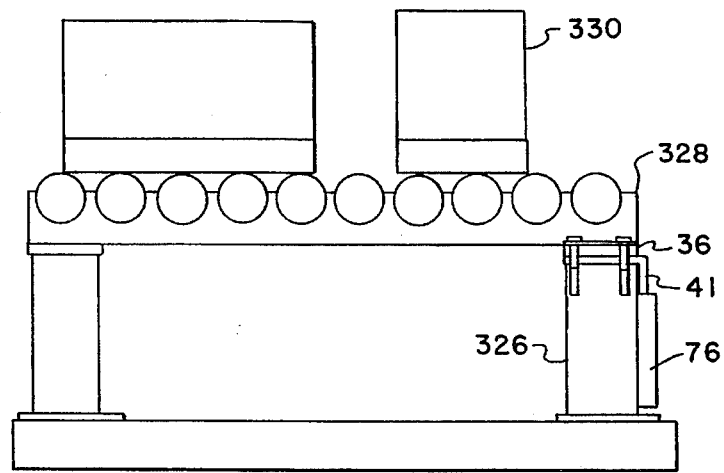
FIG. 18 illustrates a pallet conveyor employing a load sensor practiced in accordance with the principles of the present invention.
Figure 6:
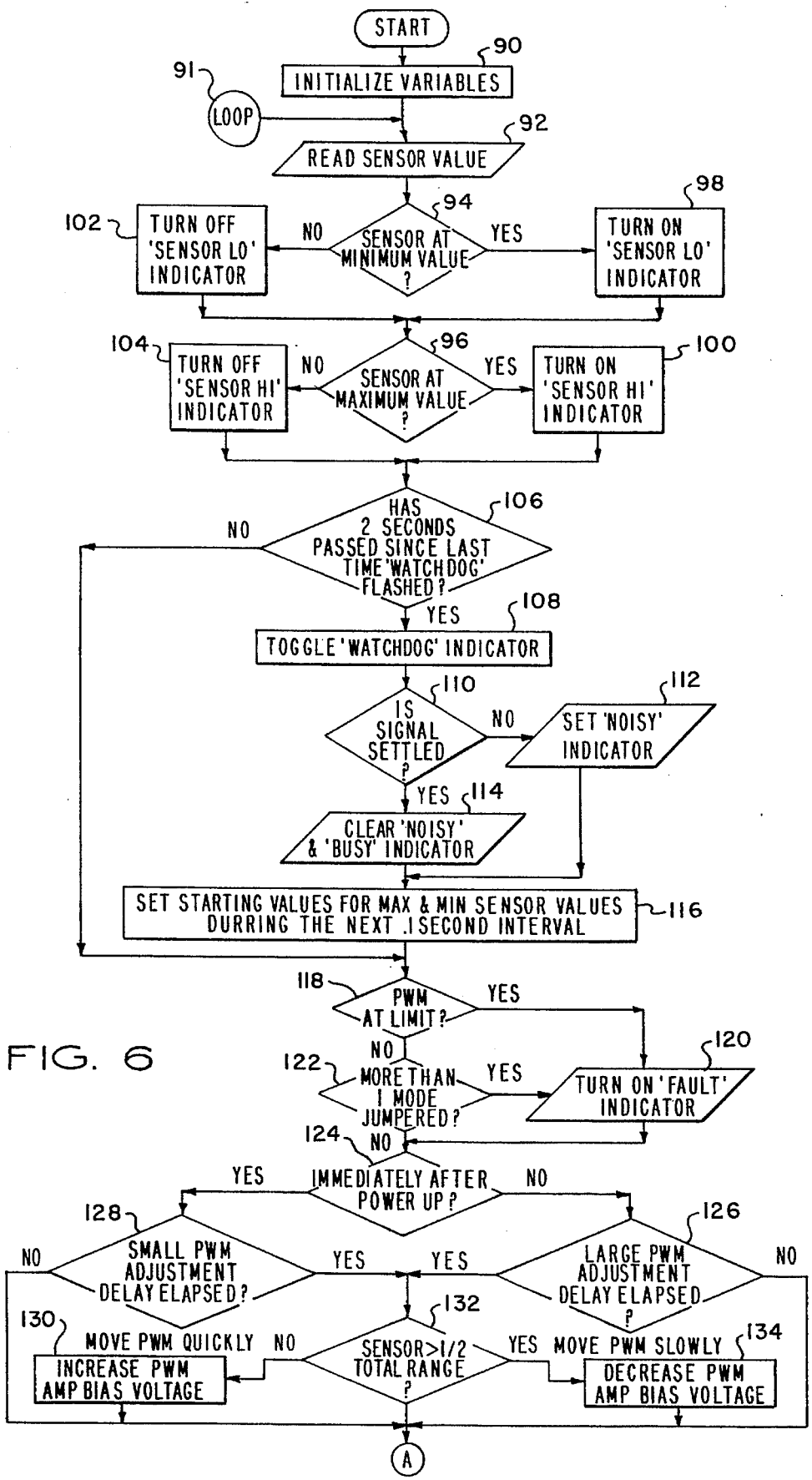
FIGS. 6–12 are flow diagrams of a method performed by the microcontroller of FIG. 1 for conditioning a signal received from the piezoelectric sensor assembly.

A conveyor load sensing application is depicted in FIG. 18. The load sensor 36 is mounted on one leg 326 of a pallet conveyor 328. As a crate 330 travels over the pallet conveyor 328, the load sensor 36 detect changes which can be used for counting the number of crates passing thereover. The static load of the conveyor 328 is nulled out such that only incremental changes in loads are measured.

Figure 19:
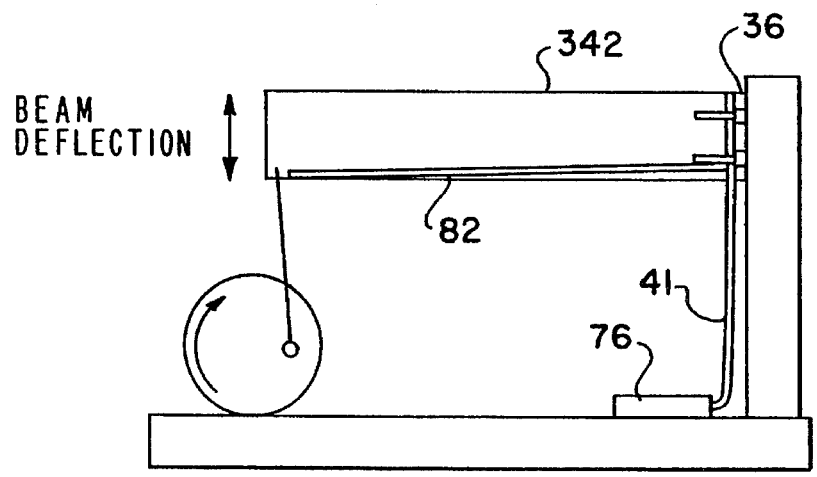
FIG. 19 illustrates an application wherein the piezoelectric cable is embedded into a deflecting structure for measuring beam deflection.

Referring now to FIG. 19, a beam deflection application is depicted wherein a piezoelectric cable 82 is longitudinally embedded in a deflecting structure 342.

Figure 20:
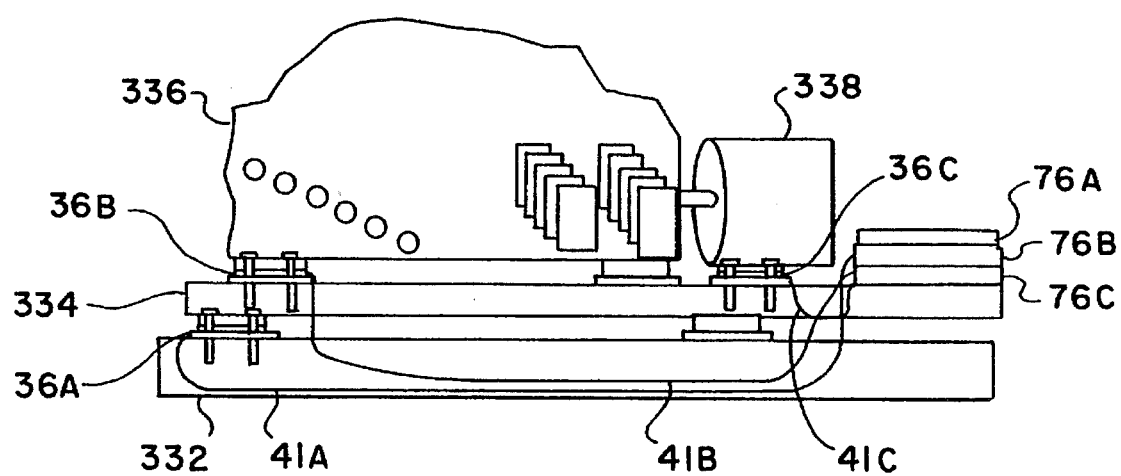
FIG. 20 illustrates a vibration monitoring application with multiple load switches practiced in accordance with the principles of the present invention.

Referring now to FIG. 20, a vibration monitoring application is depicted wherein first, second, and third load sensor switches 36A, 36B, and 36C are mounted at potential vibration locations. The first sensor 36A is mounted between the factory floor 332 and a machine deck 334 to detect large vibrations in the entire system. The second sensor 36B is mounted between the machine deck 334 and the machine 336 for detecting vibrations on the machine 336 but not the motor 338. The third sensor 36C is mounted directly below the drive motor 338 for detecting motor vibration.

The foregoing description of the preferred embodiments of the invention has been presented for the purposes of illustration and description. It is not intended to be exhaustive or to limit the invention to the precise forms disclosed. Many modifications and variations are possible in light of the above teaching. It is intended that the scope of the invention be limited not by this detailed description, but rather by the claims appended hereto.

What is claimed is:

1. A load sensing system comprising:

a piezoelectric sensor for generating a signal in response to an applied force;

amplifier means, coupled to the piezoelectric sensor, for conditioning the signal generated by the piezoelectric sensor;

processing means, coupled to the amplifier means, for interpreting the conditioned signal in accordance with a predetermined series of comparisons of the signal with threshold values, and for indicating results therefrom;

wherein the piezoelectric sensor comprises:
    a first plate;
    a length of piezoelectric cable in contact with the first plate;
    a second plate disposed adjacent to the first plate and in contact with the piezoelectric cable so that the piezoelectric cable is compressed between the first and the second plates;
    a charge amplifier having an input and an output, the input being coupled to the piezoelectric sensor; and,
    a gain amplifier having first and second inputs and an output, the first input coupled to the output of the charge amplifier, the second input coupled to the processing means for accepting an adjustable bias voltage, and the output of the gain amplifier coupled to the processing means for delivering a conditioned signal proportional to the piezoelectric signal.

2. The load sensing system as recited claim 1, wherein the processing means includes an analog to digital converter port coupled to the output of the gain amplifier for digitizing the conditioned signal.

3. A load sensing system comprising:

a piezoelectric sensor for generating a signal in response to an applied force;

amplifier means, coupled to the piezoelectric sensor, for conditioning the signal generated by the piezoelectric sensor;

processing means, coupled to the amplifier means, for interpreting the conditioned signal in accordance with a predetermined series of comparisons of the signal with threshold values, and for indicating results therefrom;

wherein the piezoelectric sensor comprises:
    a first plate;
    a length of piezoelectric cable in contact with the first plate;
    a second plate disposed adjacent to the first plate and in contact with the piezoelectric cable so that the piezoelectric cable is compressed between the first and the second plates; and,
    wherein the processing means includes a pulse width modulation output coupled to the amplifier means, for providing a D.C. bias offset voltage.

4. A load sensing system comprising:

a piezoelectric sensor for generating a signal in response to an applied force;

amplifier means, coupled to the piezoelectric sensor, for conditioning the signal generated by the piezoelectric sensor;

processing means, coupled to the amplifier means, for interpreting the conditioned signal in accordance with a predetermined series of comparisons of the signal with threshold values, and for indicating results therefrom;

wherein the piezoelectric sensor comprises:
- a first plate;
- a length of piezoelectric cable in contact with the first plate;
- a second plate disposed adjacent to the first plate and in contact with the piezoelectric cable so that the piezoelectric cable is compressed between the first and the second plates; and,
- further including a visual display coupled to the processing means, for displaying selected results from the series of comparisons of the signal with threshold values.

5. A load sensing system comprising:

a piezoelectric sensor for generating a signal in response to an applied force;

amplifier means, coupled to the piezoelectric sensor, for conditioning the signal generated by the piezoelectric sensor;

processing means, coupled to the amplifier means, for interpreting the conditioned signal in accordance with a predetermined series of comparisons of the signal with threshold values, and for indicating results therefrom;

wherein the piezoelectric sensor comprises:
- a first plate;
- a length of piezoelectric cable in contact with the first plate;
- a second plate disposed adjacent to the first plate and in contact with the piezoelectric cable so that the piezoelectric cable is compressed between the first and the second plates; and,
- wherein the predetermined series of comparisons are performed at predetermined time intervals for masking out transitory changes in the piezoelectric sensor.

6. A load sensing system comprising:

a piezoelectric sensor for generating a signal in response to an applied force;

amplifier means, coupled to the piezoelectric sensor, for conditioning the signal generated by the piezoelectric sensor;

processing means, coupled to the amplifier means, for interpreting the conditioned signal in accordance with a predetermined series of comparisons of the signal with threshold values, and for indicating results therefrom;

wherein the piezoelectric sensor comprises:
- a first plate;
- a length of piezoelectric cable in contact with the first plate;
- a second plate disposed adjacent to the first plate and in contact with the piezoelectric cable so that the piezoelectric cable is compressed between the first and the second plates; and,
- further comprising means for selecting one of the predetermined series of comparisons.

7. The load sensing system as recited in claim 6, wherein the means for selecting one of the predetermined series of comparisons is a set of configurable jumpers.

* * * * *